(12) United States Patent
Nakanishi

(10) Patent No.: US 9,593,436 B2
(45) Date of Patent: Mar. 14, 2017

(54) TAPERED MULTIFILAMENT YARN AND PROCESS FOR PRODUCING THE SAME

(75) Inventor: Shigeru Nakanishi, Minamiawaji (JP)

(73) Assignee: YOZ-AMI CORPORATION, Hyogo (JP)

( * ) Notice: Subject to any disclaimer, the term of this patent is extended or adjusted under 35 U.S.C. 154(b) by 879 days.

(21) Appl. No.: 12/087,896

(22) PCT Filed: Dec. 28, 2006

(86) PCT No.: PCT/JP2006/326213
§ 371 (c)(1),
(2), (4) Date: Jul. 17, 2008

(87) PCT Pub. No.: WO2007/083510
PCT Pub. Date: Jul. 26, 2007

(65) Prior Publication Data
US 2009/0158563 A1    Jun. 25, 2009

(30) Foreign Application Priority Data
Jan. 18, 2006    (JP) .................................. 2006-009793

(51) Int. Cl.
| | | |
|---|---|---|
| *D02G 1/10* | (2006.01) | |
| *D02G 3/34* | (2006.01) | |
| *D01D 5/20* | (2006.01) | |
| *D01F 6/04* | (2006.01) | |
| *D02J 1/22* | (2006.01) | |
| *D04C 1/12* | (2006.01) | |
| *D06M 11/83* | (2006.01) | |
| *D06M 15/00* | (2006.01) | |
| *A01K 91/16* | (2006.01) | |

(52) U.S. Cl.
CPC ................ *D02G 3/34* (2013.01); *A01K 91/16* (2013.01); *D01D 5/20* (2013.01); *D01F 6/04* (2013.01); *D02J 1/22* (2013.01); *D04C 1/12* (2013.01); *D06M 11/83* (2013.01); *D06M 15/00* (2013.01)

(58) Field of Classification Search
USPC ............ 428/375, 373, 395; 264/210.1–210.7
See application file for complete search history.

(56) References Cited

U.S. PATENT DOCUMENTS

2003/0082381 A1 * 5/2003 Nakanishi ..................... 428/375
2006/0174536 A1    8/2006 Nakanishi

FOREIGN PATENT DOCUMENTS

| JP | 2002-339184 |   | 11/2002 |
|---|---|---|---|
| JP | 2002339184 A | * | 11/2002 |
| JP | 2005-76149 |   | 3/2005 |

OTHER PUBLICATIONS

Tapered Definition http://www.thefreedictionary.com/.*
Supplementary European Search Report issued Feb. 11, 2011 in European Patent Application No. 06 84 3591.
International Search Report issued Mar. 6, 2007 in the International (PCT) Application of which the present application is the U.S. National Stage.

* cited by examiner

*Primary Examiner* — Jennifer Chriss
*Assistant Examiner* — Ricardo Lopez
(74) *Attorney, Agent, or Firm* — Wenderoth, Lind & Ponack, L.L.P.

(57) ABSTRACT

A process for producing a tapered multifilament yarn comprising feeding a drawable filament to a drawing apparatus and changing the take-over speed relative to the feed speed of the filament in order to change the thickness of the filament in a longitudinal direction, characterized by making the take-over speed slower than the feed speed under heating in a part of the filament in the longitudinal direction and thereby shrinking and thickening the part of the filament. According to the process, the ratio of the thickness of the thickest part of the tapered multifilament yarn to the thickness of the thinnest part thereof can be easily increased.

5 Claims, No Drawings

TAPERED MULTIFILAMENT YARN AND PROCESS FOR PRODUCING THE SAME

This application is a U.S. National Stage of International Application No. PCT/JP2006/326213 filed Dec. 28, 2006.

TECHNICAL FIELD

The present invention relates to a tapered multifilament yarn which is used, for example, as fly lines or fly leaders for fly fishing, taper Chikara (thick and strong) lines for surf casting, fishing lines or leaders for Tenkara fishing (Japanese traditional mountain stream fishing using a fly) in the field of fishing, and used, for example, as decorative cords in the field of other industrial materials, and to a process for producing the tapered multifilament yarn.

BACKGROUND ART

Conventionally, as a tapered multifilament line made of a plurality of filaments and having nonuniform thickness, there has been known, for example, a tapered multifilament yarn in which some of the plurality of filaments, are cut away halfway in the longitudinal direction toward an end of the yarn to reduce the thickness of the yarn in the longitudinal direction, and the remaining filaments are used as the yarn core (see, for example, Japanese Patent Application Laid-Open Publication No. 8-289708, hereinafter referred to as "Prior art 1").

This prior art 1 has a problem of impaired smoothness of a yarn especially in the cut site, causing the yarn to be easily caught on a scrag, reducing the slipperiness between the yarn and the guide of a fishing rod due to increased frictional resistance, or making the line tend to be cut. Further, there has also been another problem of poor operating efficiency because a braiding machine used to produce the tapered line has to be stopped during braiding for cutting away a certain number of filaments for reducing the diameter of the line.

In order to solve the above-mentioned problems, there has been proposed a tapered multifilament yarn formed by drawing a multifilament or a yarn into a tapered shape (see Japanese Patent Application Laid-Open Publication No. 2002-339184, hereinafter referred to as "Prior art 2"). The thickness of this tapered multifilament yarn is changed in the longitudinal direction by changing the take-over speed relative to the feed speed of the filament while the drawable multifilament is drawn.

This prior art 2 has an advantage that the tapered multifilament yarn is excellent in smoothness because the filament has no cut site, the yarn having considerable durability because of the good slipperiness between the yarn and the guide of a fishing rod, and the like. Further, the yarn can be produced easily and efficiently because there is no need to cut away any filament. Also, any degree of tapering can be set by adjusting the drawing rate of the filament.

DISCLOSURE OF THE INVENTION

Problems to be Solved by the Invention

However, in the prior art 2, the ratio of the take-over speed to the feed speed of the filament during drawing, that is, the drawing rate is restricted by the material of filaments and the state of drawing a material yarn. For example, in the case of using an undrawn filament, the drawing rate is set to about 1.01 to 15, and in the case of redrawing a drawn filament, the drawing rate is set to about 1.01 to 5, preferably about 1.01 to 3. Therefore, in some cases, it was not easy to increase the ratio of the thickness of the thickest part to the thickness of the thinnest part of a tapered multifilament yarn.

The technical object of the present invention is, by solving the above-mentioned problems, to provide a tapered multifilament yarn and a process for the production thereof which allow easy and efficient production and easy increase of the ratio of the thickness of the thickest part to the thickness of the thinnest part of a tapered multifilament yarn.

Means for Solving the Problems

In order to solve the above-mentioned problems, the present invention is configured as follows.
That is, the present invention relates to:
(1) a process for producing a tapered multifilament yarn comprising feeding a drawable filament to a drawing apparatus and changing the take-over speed relative to the feed speed of the filament in order to change the thickness of the filament in a longitudinal direction, characterized by making the take-over speed slower than the feed speed under heating in a part of the filament in the longitudinal direction and thereby shrinking and thickening the part of the filament;
(2) the process for producing a tapered multifilament yarn according to the item (1), wherein the drawable filament is a multifilament;
(3) the process for producing a tapered multifilament yarn according to the item (1) or (2), wherein the drawable filament comprises an undrawn filament;
(4) the process for producing a tapered multifilament yarn according to the item (1) or (2), wherein the drawable filament comprises a filament previously subjected to a drawing treatment;
(5) the process for producing a tapered multifilament yarn according to any one of the items (1) to (4), wherein a ratio of the take-over speed to the feed speed of the filament is gradually changed;
(6) the process for producing a tapered multifilament yarn according to any one of the items (1) to (5), wherein when the take-over speed is slower than the feed speed, the ratio of the take-over speed to the feed speed of the filament is not less than 0.5 and less than 1;
(7) the process for producing a tapered multifilament yarn according to any one of the items (1) to (6), wherein when the drawable filament is drawn, the ratio of the take-over speed to the feed speed of the filament is not more than 6;
(8) the process for producing a tapered multifilament yarn according to any one of the items (1) to (7), wherein a plurality of drawable filaments is integrated, and then the integrated multifilament yarn is fed to a drawing apparatus to be formed into a tapered shape;
(9) the process for producing a tapered multifilament yarn according to item (8), wherein the integrated multifilament yarn is coated with a synthetic resin, and then the coated integrated multifilament yarn is fed to a drawing apparatus to thereby be formed into a tapered shape;
(10) the process for producing a tapered multifilament yarn according to any one of the items (1) to (7), wherein a drawable filament is fed to a drawing apparatus to thereby be formed into a tapered shape, and then a plurality of the tapered filaments is integrated;
(11) the process for producing a tapered multifilament yarn according to the item (10), wherein a metal wire is further combined together when the plurality of tapered filaments is integrated;

(12) the process for producing a tapered multifilament yarn according to any one of the items (8) to (10), wherein means of integration is braiding;

(13) the process for producing a tapered multifilament yarn according to any one of the items (1) to (7), wherein a step for integrating a plurality of drawable filaments using a heat-adhesive resin and a step for forming the integrated multifilament yarn into a tapered shape are simultaneously performed;

(14) the process for producing a tapered multifilament yarn according to any one of the items (1) to (13), wherein the tapered multifilament yarn is further coated with a synthetic resin;

(15) a tapered multifilament yarn made of a plurality of filaments formed into tapered shapes by changing the take-over speed relative to the feed speed of the filament, characterized by taking-over the filament at a take-over speed slower than the feed speed under heating and thereby shrinking and thickening a part of the filament;

(16) the tapered multifilament yarn according to the item (15), wherein each of the taper-formed filaments is an ultra-high molecular weight polyethylene filament;

(17) the tapered multifilament yarn according to the item (15) or (16), which is coated with a synthetic resin;

(18) the tapered multifilament yarn according to the item (17), wherein the synthetic resin contains metal particles;

(19) the tapered multifilament yarn according to any one of the items (15) to (18), wherein the filament contains metal particles; and

(20) the tapered multifilament yarn according to any one of the items (15) to (19), wherein the fineness of the filament in the shrunk part is not more than 2 times that of an unshrunk filament.

Effect of the Invention

The present invention provides a process in which a filament is subjected to a drawing treatment and a part of the filament in the longitudinal direction is subjected to a shrinking treatment, unlike a conventional process in which a filament is subjected to only a drawing treatment when the filament is formed into a tapered shape by a drawing apparatus. Therefore, a tapered multifilament yarn obtained according to the present invention is excellent in smoothness without any cut site thereof, and at the same time, it is easy to increase the ratio of the thickness of the thickest part to the thickness of the thinnest part of a tapered multifilament yarn since the part subjected to a shrinking treatment can be thickened.

Further, there is no need to cut away any filament halfway, the shrinking treatment can be achieved by only slowing the take-over speed relative to the feed speed, and a drawing apparatus used in the prior art 2 or the like can be employed as it is. Therefore, the tapered multifilament yarn can be produced easily and efficiently.

BEST MODE FOR CARRYING OUT THE INVENTION

A tapered multifilament yarn according to the present invention is a tapered multifilament yarn made of a plurality of filaments formed into tapered shapes by changing the take-over speed relative to the feed speed of the filament, the tapered multifilament yarn obtained by taking over the filament at a take-over speed slower than the feed speed under heating to shrink and thicken a part of the filament.

Such a tapered multifilament yarn according to the present invention can be produced by a process described below.

In the present invention, a drawable filament is fed to a drawing apparatus, and the thickness of the filament in the longitudinal direction is changed by changing the take-over speed relative to the feed speed of the filament. This means that a part in the longitudinal direction of the filament is drawn while the take-over speed is made faster than the feed speed, and on the other hand, another part in the longitudinal direction of the filament is shrunk and thickened while the take-over speed is made slower than the feed speed under heating. The filament is formed into a tapered shape by performing both drawing and shrinking.

When the above-mentioned drawable filament is heated, molecular orientation thereof tries to relax and then shrink, and therefore the filament shrinks and gets thickened in the lengthwise direction depending on the ratio of the take-over speed to the feed speed of the filament. This phenomenon occurs not only in the case of a material yarn of a filament subjected to a drawing treatment but also in the case of an undrawn filament which has not been subjected to a so-called drawing treatment. This is attributed to the fact that even in the case of an undrawn filament, the filament has oriented molecules because of its fibrous texture. This thickens the filament in the part subjected to a shrinking treatment. As a result, without excessively increasing the drawing rate in drawing another part of the filament, or even when the drawing rate cannot be increased, an increased ratio of the thickness of the thickest part of the filament subjected to a shrinking treatment to the thickness of the thinnest part of the filament subjected to a drawing treatment is obtained.

Further, only slowing the take-over speed relative to the feed speed is necessary for the above-mentioned shrinking treatment. A drawing apparatus used in the present invention is not particularly limited, but may be any one as long as the take-over speed of a filament can be made faster than the feed speed thereof, and the take-over speed can also be made slower than the feed speed. As the drawing apparatus, any publicly known apparatus including a supply roller (feed roller) and a take-over roller (take-up roller) suitable for both drawing treatment and relaxation heat treatment can be used. Specifically, a drawing apparatus used in the prior art 2 or the like can be employed as it is.

Herein, the above-mentioned drawable filament used in the present invention may be any one as long as it can be subjected to a drawing treatment, and may be, for example, a filament which has already been subjected to a drawing treatment during production, like commercially available filaments, or an undrawn filament which has not been subjected to any drawing treatment during production. In addition, a filament which has already been subjected to a drawing treatment during production at a drawing rate less than that of a commercially available filament which has already been subjected to a drawing treatment may be used.

The above-mentioned drawable filament may be a multifilament or a monofilament. It is to be noted that a "multifilament yarn" means a yarn made of a plurality of filaments, and a "tapered multifilament yarn" means a yarn formed into a tapered shape made of a plurality of filaments in the present invention. In addition, a "component filament" means a filament constituting a tapered multifilament yarn, but, in some cases, it means a component filament before tapering.

The above-mentioned ratio of the take-over speed to the feed speed of a filament may be drastically changed, but preferably, the ratio is to be changed gradually in order to change the thickness of a filament little by little continuously, imparting good smoothness to the resultant tapered multifilament yarn. The change of the speed ratio may be linear or not.

When the take-over speed is made slower than the feed speed, the ratio of the take-over speed to the feed speed is set low because, for example, a filament drawn in a production step generally easily shrinks as compared with an undrawn filament. Accordingly, the ratio of the take-over speed to the feed speed varies with, for example, the material of the component filament, the degree of the drawing treatment which the filament has previously been subjected to, and the like, and thus is not limited to a specific range, but if the ratio is set to an excessively low value, physical properties of the obtained filament may be adversely affected, and therefore, the ratio is preferably set to not less than 0.5 and less than 1.

The above-mentioned drawable filament may be subjected to a drawing treatment in any part which is not subjected to a shrinking treatment, and the ratio of the take-over speed to the feed speed of the filament, that is, the drawing rate is appropriately selected depending on the component filament type, the degree of the drawing treatment which the filament has previously been subjected to, the structure of the filament yarn and the like.

More specifically, for example, when a filament drawn in a production step like commercially available filaments is used as a component filament, the drawing rate is set to about 1.01 to 5, preferably about 1.01 to 3, and more preferably about 2.2 to 3. On the other hand, when an undrawn filament that is not subjected to a drawing treatment or a filament that is not drawn to the same degree as commercially available filaments are drawn is used as a component filament, the drawing rate is set to about 1.01 to 15, about 2 to 10, and more preferably about 4 to 8. In addition, for example, when a yarn made of a plurality of component filaments is drawn, the drawing rate is preferably set to about 2 to 6, and when a multifilament is drawn, the drawing rate is preferably set to about 1.5 to 4.

The above-mentioned shrinking method and drawing method are not limited to a specific method, and for example, a publicly known method in which a filament is subjected to a treatment while being heated in a liquid or a gas may be adopted. A shrinking treatment or a drawing treatment may be performed in one step or two or more steps. In addition, since the heating temperature during a shrinking treatment or a drawing treatment is different depending on the type of the component filament, the thickness of the yarn and the like, the temperature cannot be generally specified, but typically a drawing treatment is preferably performed at a temperature equal to or higher than the melting point of the component filament, specifically about 120 to 300° C., preferably about 130 to 250° C., more preferably about 130 to 200° C., and still more preferably about 130 to 170° C.

Specific examples of the drawable filament include a filament made of synthetic resins such as a polyolefin-based, polyamide-based, polyester-based, fluorine-based, polyacrylonitrile-based, polyvinyl alcohol-based or polyacetal-based resin. In the present invention, one of filaments made of these synthetic resins may be used singly or two or more kinds thereof may be used in any combination.

More specifically, examples of the polyolefin-based resin include polyethylene and polypropylene, and among them, a resin having a polymerization average molecular weight of not less than about 400,000 is preferred. The polyethylene and polypropylene may be a homopolymer or a copolymer.

Specific examples of the copolymer include a copolymer containing one or more alkenes copolymerizable with ethylene in a small amount, preferably at a rate of not more than about 5% by weight and having about 1 to 10, preferably about 2 to 6 methyl groups or ethyl groups per 100 carbon atoms. Examples of the alkenes copolymerizable with ethylene include propene, butene, pentene, hexene, octene, 4-methyl pentene, and the like. In addition, examples of the copolymer include, for example, an ethylene-vinyl acetate copolymer (EVA), and the like.

Examples of the polyamide-based resin include an aliphatic polyamide such as nylon 6, nylon 66, nylon 12 and nylon 6,10 or a copolymer thereof, or a semi-aromatic polyamide formed by an aromatic diamine and a dicarboxylic acid, or a copolymer thereof, and the like.

Examples of the polyester-based resin include a polyester or a copolymer thereof obtained by polycondensation of an aromatic dicarboxylic acid such as terephthalic acid, isophthalic acid, naphthalene-2,6-dicarboxylic acid, phthalic acid, α,β-(4-carboxyphenyl)ethane, 4,4'-dicarboxyphenyl or sodium 5-sulfoisophthalic acid, an aliphatic dicarboxylic acid such as adipic acid or sebacic acid, or esters thereof, and a diol compound such as ethylene glycol, diethylene glycol, 1,4-butanediol, polyethylene glycol, tetramethylene glycol, and the like.

Examples of the fluorine-based resin include polyvinylidene fluoride, polytetrafluoroethylene, polymonochlorotrifluoroethylene or polyhexafluoropropylene, or copolymers thereof, and the like.

Examples of the polyacrylonitrile-based resin include a polyacrylonitrile-based resin that is a copolymer of acrylonitrile with other polymers. Examples of other polymers include methacrylate, acrylate, vinyl acetate, and the like, and these polymers are preferably contained at a rate of not more than about 5% by weight.

Examples of the polyvinyl alcohol-based resin include a polyvinyl alcohol-based resin that is a copolymer of vinyl alcohol with other polymers. Examples of other polymers include vinyl acetate, ethene, other alkenes, and the like, and these polymers are preferably contained at a rate of not more than about 5% by weight.

The above-mentioned drawable filament used in the present invention is preferably a filament having high creep properties among others. Here, this "filament having high creep properties" refers to a filament such that the shape is continuously retained after drawing. More specifically, when a half load of the rupture strength of a fiber constituting a filament is continuously applied to the filament for 100 hours, and the load is then removed, a yarn having a permanent elongation of not less than about 1%, preferably not less than about 5%, and more preferably not less than about 10% is preferred as a filament having high creep properties. It is to be noted that the permanent elongation can be measured using a publicly known measuring machine, for example, the universal testing machine "Autograph AG-100kNI" (trade name, manufactured by Shimadzu Corporation).

Specific preferable examples of the above-mentioned filament having high creep properties include a polyacetal-based filament and an ultra-high molecular weight polyethylene filament. The polyacetal-based filament is produced, for example, in a manner known per se such as melt spinning process of a polyacetal-based resin having an acetal bond in the main chain such as polyoxymethylene. The polyacetal-based filament preferably has a tensile strength of not less than about 4 g/d and an elongation of not more than about 20%. Tensile strength and rupture elongation can easily be measured using a known measuring machine, for example, the universal testing machine "Autograph AG-100kNI" (trade name, manufactured by Shimadzu Corporation).

Further, the above-mentioned ultra-high molecular weight polyethylene filament can be produced according to a known method disclosed in, for example, Japanese Patent Application Laid-Open Publication No. 55-5228 or 55-107506. Alternatively, as the ultra-high molecular weight polyethylene filament, a commercially available product such as Dyneema (trade name, manufactured by TOYOBO CO., Ltd.) and Spectra (trade name, manufactured by Allied Signal Inc.) may be used.

As an ultra-high molecular weight polyethylene constituting the above-mentioned ultra-high molecular weight polyethylene filament, polyethylene having a molecular weight of not less than about 200,000, preferably not less than about 600,000 is preferably used. Such ultra-high molecular weight polyethylene may be a homopolymer or a copolymer of ethylene with a lower α-olefin having about 3 to 10 carbon atoms, for example, propylene, butene, pentene or hexene. As this copolymer of ethylene with an α-olefin, a copolymer containing the latter of about 0.1 to 20, preferably about 0.5 to 10 per 1000 carbon atoms on average is preferably used, and such a copolymer exhibits excellent mechanical properties such as high strength.

In the present invention, a component filament may contain an abrasion resistant agent, a delustering agent, a modifier or pigment, each of which is publicly known, or two or more thereof within an extent not impairing the object of the present invention. In addition, a component filament may contain a magnetic material, a conductive material, a material having a high dielectric constant, or the like.

In the present invention, a component filament may contain metal particles in order to increase the specific gravity of the tapered multifilament yarn. Here, examples of the metal particles to be used include a single metal, a mixture or an alloy of iron, copper, zinc, tin, nickel, tungsten and the like. Among them, tungsten having a high specific gravity is preferred. This is because use of a metal having a high specific gravity easily imparts weight to a yarn, that is to say, adding even a small amount of such a metal exerts an effect of increasing specific gravity, and as a result, the strength reduction of a material resin can be prevented as much as possible.

The above-mentioned metal particles can be used in the form of powder or granule in the present invention. When the particle diameter of the metal particles is too large, total uniformity after mixing becomes poor. Therefore the diameter is preferably set to not more than about 20 μm, more preferably not more than about 10 μm. These metal particles are preferably added within the range about 1 to 90 parts by weight, more preferably about 5 to 70 parts by weight based on 100 parts by weight of a thermoplastic resin constituting a component filament.

The above-mentioned drawable filaments may be made to form a tapered multifilament yarn by previously integrating a plurality of the drawable filaments and then subjecting the integrated multifilament yarn to the above-mentioned drawing and shrinking treatment to be formed into a tapered shape, or by previously tapering drawable multifilaments by drawing and shrinking treatment, and then combining a plurality of the resultant tapered filaments.

The above-mentioned "integration" refers to the combining of a plurality of component filaments to keep them together. Known means may be used for this integration, and include, for example, means for twining or braiding a plurality of component filaments, and means for fusing the component filaments to each other using a thermal adhesive resin. In addition, when two or more kinds of filaments are used, the filaments may be combined by using one of the filaments as a core yarn, braiding the rest of the filaments around the core yarn, or arranging and fusing the rest of the filaments so as to surround the periphery of the core yarn.

When the above-mentioned drawable filaments are previously integrated, a component filament may have any form of, for example, a multifilament, a monofilament and a mono-multifilament. Here, a "mono-multifilament" usually refers to a yarn obtained by combining a plurality of mono-filament yarns.

In the above-mentioned integration step, a plurality of filaments is preferably braided, and a plurality of multifilaments is particularly preferably braided. The braiding method is not particularly limited, but usually a braiding machine is used. For example, four multifilaments are prepared and filaments on the right side and the left side are alternately arranged at the center to be braided with each other. It is to be noted that the number of multifilaments used for braiding is not limited to 4 and in some cases may be 8, 12 or 16.

Further, when a plurality of multifilaments previously formed into tapered shapes by drawing and shrinking is integrated by braiding, the braiding pitch can be adjusted by changing the gear of the braiding machine depending on the diameter of the component filament. In this way, an advantage of further improved smoothness of the tapered multifilament yarn is obtained.

When the above-mentioned plurality of multifilaments formed into tapered shapes by drawing and shrinking is integrated by braiding or other means, a metal wire can be further combined together with the plurality of tapered multifilaments. In this way, an advantage of setting any specific gravity of the tapered multifilament yarn by adding a metal wire can be obtained.

Here, known methods may be used for combining the tapered multifilament yarn with a metal wire, and include, for example, a method for twining or braiding the multifilaments with a metal wire, and a method for fusing the multifilaments with a metal wire using a thermal adhesive resin as described above. In addition, by using a metal wire as a core yarn, the tapered multifilaments may be braided around the core yarn, or arranged and fused so as to surround the periphery of the core yarn. Among others, the yarn of the present invention preferably has a core-sheath structure having a metal wire as a core yarn.

The kind of the above-mentioned metal wire is not limited to a specific one, and per se known metal wires may be used. Specific examples of the metal wires include copper wires, stainless steel wires, lead wires, tungsten wires, soft wires and amorphous wires of various alloys, and the like. Among them, lead wires are preferably used because of low cost.

When component filaments are integrated by fusing them with a thermal adhesive resin as described above, the step of integrating a plurality of drawable filaments with a thermal adhesive resin and the step of drawing and shrinking for forming the integrated multifilament yarn into a tapered shape can be simultaneously performed. In this case, as both of the fusing treatment and the drawing and shrinking treatment are performed under heating, an advantage of further efficient production of a tapered multifilament can be obtained by performing both the steps at one time.

A method for fusing a plurality of component filaments with a thermal adhesive resin in the present invention as described above includes, for example, the following methods, but it is needless to say that the method is not limited to them.

(a) A method in which component filaments are immersed in a thermal adhesive resin filled in a bath and impregnated with the resin, or component filaments are coated with a resin and then bundled, and thereafter twined or braided if necessary, and then heated to form a fused yarn.

(b) A method in which a thermal adhesive resin in a fiber form (hereinafter, simply referred to as a "thermal adhesive resin fiber") is used, and all component filaments are arranged in contact with this thermal adhesive resin fiber, and thereafter twined or braided if necessary, and then heated to fuse together.

The above-mentioned thermal adhesive resin fiber may be fabricated from a thermal adhesive resin, or may be a fiber having a center yarn coated with a thermal adhesive resin. In the latter case, the drawable filaments described above can be preferably used as the center yarn. A yarn having a thickness of about 10 to 50 μm is preferably used as the center yarn. The coating method may be any method, and per se known methods may be used. For example, coating can be formed by impregnating the center yarn in a bath containing a thermal adhesive resin, squeezing excess resin therefrom, and then drying the yarn. The thermal adhesive resin fiber produced by coating preferably has a thickness of about 1.3 to 3 times that of the center yarn.

When the component filaments are fused to each other with the above-mentioned thermal adhesive resin, the temperature is usually not less than that of the thermal adhesive resin and not more than the melting point of the component filament, preferably about 50 to 160° C., and more preferably about 60 to 130° C.

The above-mentioned thermal adhesive resin used for fusing component filaments preferably has a melting point lower than that of the component filament. Specifically, the thermal adhesive resin is a resin having a melting point of about 50 to 160° C., preferably a resin having a melting point of about 60 to 135° C., and particularly preferably a resin having a melting point of about 100° C. The melting point of a thermal adhesive resin can be easily measured, for example, by a method according to JIS L 1013 "Testing methods for man-made filament yarns" using "DSC7" manufactured by PerkinElmer, Inc.

As the above-mentioned thermal adhesive resin, a known resin may be used as long as it has the above-mentioned melting point, and specifically, for example, a polyolefin-based resin, a polyester-based resin, a polyamide-based resin, or the like, can be used. Among them, this thermal adhesive resin is preferably, for example, a polyolefin-based resin made of a polyolefin copolymer mainly containing polyethylene or polypropylene, being a soft resin that can be softened when heated at a temperature of about 50° C. for about 10 seconds. In addition, a polyolefin resin having a melting point of about 100° C. and exhibiting low viscosity in its molten state is also preferred. These polyolefin resins easily go into a fluidized state when heated for only a short period of time, and can rapidly diffuse not only across the surface of a fiber but also penetrate into the center thereof, and therefore can exert an excellent adhesive function.

The weight ratio of a thermal adhesive resin and a component filament is desirably about 1:1 to 100. The above-mentioned range is preferred in order to obtain sufficient adhesion and at the same time to prevent the thermal adhesive resin from squeezing out and thereby impairing the smoothness of the surface of a tapered multifilament yarn of the present invention.

The tapered multifilament yarn of the present invention may be a yarn the surface thereof is further coated with a synthetic resin. Coating the surface of a yarn with a synthetic resin in this way provides an advantage of smoothing the surface of the tapered multifilament yarn and further improving water absorption resistance and abrasion resistance.

Examples of the above-mentioned synthetic resin used for coating (hereinafter, simply referred to as "coating resin") include synthetic resins such as polypropylene, vinyl chloride, acrylic, urethane, nylon, polyester, epoxy, vinyl acetate and ethylene-vinyl acetate resins, and the synthetic resins may be emulsion type or solvent type. In addition, natural rubber and synthetic rubber such as SBR can also be used. Among them, polypropylene is preferably used.

The above-mentioned coating resin may contain metal particles. This provides an advantage that any specific gravity of the tapered multifilament yarn can be set according to the present invention. The kind, size and content of metal particles to be added to this coating resin are the same as in the above-mentioned case where metal particles are added to a component filament.

The tapered multifilament yarn according to the present invention coated with the above-mentioned synthetic resin can be produced by integrating a plurality of filaments, coating the integrated multifilament yarn with a synthetic resin, and then forming the resultant multifilament yarn into a tapered shape by drawing and shrinking, or by coating a multifilament yarn previously formed into a tapered shape by drawing and shrinking with a synthetic resin. The multifilament yarn previously formed into a tapered shape by drawing and shrinking may be a multifilament yarn formed into a tapered shape by drawing and shrinking, or a multifilament yarn formed by combining and integrating component filaments each thereof is previously formed into a tapered shape by drawing and shrinking.

It is to be noted that per se known methods may be used as the above-mentioned coating method using a coating resin, and examples thereof include melt extrusion coating, and the like.

The tapered multifilament yarn according to the present invention may be colored. As this coloring method, per se known methods can be used. For example, a colored and tapered multifilament yarn can be produced by passing the tapered multifilament yarn of the present invention through a bath containing a colorant solution therein at room temperature, for example, at a temperature of about 20 to 25° C., then drying the yarn coated with the colorant, and passing this coated yarn through a furnace which is maintained at a temperature of about 100 to 130° C.

As the above-mentioned colorant, inorganic pigments, organic pigments and organic dyes are known, and preferable examples thereof include titanium oxide, cadmium compounds, carbon black, azo compounds, cyanine dyes, polycyclic pigments, and the like.

EXAMPLES

Hereinafter, the embodiments of the present invention will be described according to examples.

Example 1

Sixteen ultra-high molecular weight polyethylene multifilaments (trade name: Dyneema, manufactured by TOYOBO CO., Ltd.) as side yarns and a polyolefin-based thermal adhesive resin fiber (trade name: Thermolux PO105, 300d/lF manufactured by Luxilon) as a core yarn were round braided into a multifilament yarn as raw material using a braiding machine. The multifilament yarn was fed to a heating furnace which had been heated to 170° C., and then subjected to a drawing and shrinking treatment while the ratio of the take-over speed of the take-over roller to the feed speed of the feed roller was being increased linearly and gradually from 0.5 to 3 by controlling the speed of the feed roller and the take-over roller.

When the ratio of the take-over speed of the take-over roller to the feed speed of the feed roller was 0.5 to less than 1 in the drawing and shrinking treatment under heating, the multifilament yarn as raw material shrank, and when the speed ratio exceeded 1, the multifilament yarn as raw material was drawn, and thus an as a whole tapered multifilament yarn was obtained. This resultant tapered multifilament yarn had an overall length of 7 m and a smooth tapered shape with Size 24 (diameter: 0.81 mm) at one end thereof and Size 4 (diameter: 0.33 mm) at the other end thereof.

Example 2

Eight undrawn ultra-high molecular weight polyethylene multifilaments (trade name: Dyneema, manufactured by TOYOBO CO., Ltd.) were round braided into a multifilament yarn as raw material. As the undrawn ultra-high molecular weight polyethylene multifilament, a multifilament of 400 d/96 F was used. The 400 d/96 F multifilament was obtained by drawing a raw multifilament at a drawing rate of 25% of its maximum drawing rate, the raw multifilament having a fineness of 100 d when drawn at the maximum drawing rate. The multifilament yarn as raw material obtained by braiding the raw multifilament was fed to a heating furnace which had been heated to 170° C., and then subjected to a drawing and shrinking treatment while the ratio of the take-over speed of the take-over roller to the feed speed of the feed roller was being increased linearly and gradually from 0.5 to 4 by controlling the speed of the feed roller and the take-over roller.

In the same manner as in Example 1 described above, When the ratio of the take-over speed of the take-over roller to the feed speed of the feed roller was 0.5 to less than 1 in the drawing and shrinking treatment under heating, the multifilament yarn as raw material shrank, and when the speed ratio exceeded 1, the multifilament yarn as raw material was drawn, and thus an as a whole tapered multifilament yarn was obtained. This resultant tapered multifilament yarn had an overall length of 7 m and a smooth tapered shape with Size 32 (diameter: 0.93 mm) at one end thereof and Size 4 (diameter: 0.33 mm) at the other end thereof.

Example 3

The same undrawn ultra-high molecular weight polyethylene multifilament as used in Example 2 was fed to a heating furnace which had been heated to 170° C., and then subjected to a drawing and shrinking treatment while the ratio of the take-over speed of the take-over roller to the feed speed of the feed roller was being increased linearly and gradually from 0.5 to 5 by controlling the speed of the feed roller and the take-over roller. Thus the undrawn multifilament was changed into an as a whole smooth tapered multifilament. Next, eight tapered multifilaments obtained in the above mentioned way were round braided into a multifilament yarn. The resultant tapered multifilament yarn had an overall length of 7 m and a smooth tapered shape with Size 32 (diameter: 0.93 mm) at one end thereof and Size 3 (diameter: 0.29 mm) at the other end thereof.

A tapered multifilament yarn and a process for producing thereof described in each of the above embodiments are only illustrative for embodying technical ideas of the present invention, and shapes, structures, materials, complex structures, drawing rates, shrinkage ratios, processing temperatures, and the like, of multifilaments are not limited to those in the embodiments, and various modifications can be made within the scope of the claims of the present invention.

For example, although a braided yarn has been described in each of the above-mentioned examples, a multifilament yarn of the present invention may be a yarn obtained by twining multifilaments or a yarn obtained by fusing multifilaments with a thermal adhesive resin. Further, any part of the multifilament can be subjected to the drawing treatment and the shrinking treatment. As for the process sequence, the shrinking treatment may be followed by the drawing treatment, or on the contrary, the drawing treatment may be followed by the shrinking treatment. Furthermore, needless to say, materials and fineness of a filament are not limited to those in the above-mentioned examples.

INDUSTRIAL APPLICABILITY

The present invention is particularly preferably used for fly lines or fly leaders for fly fishing, fishing lines for surf casting, taper Chikara (thick and strong) lines of casting lines, fishing lines for Tenkara fishing and the like, and is also preferably used for other purposes since the tapered multifilament yarn of the present invention is excellent in smoothness without any cut site thereof, and at the same time, the ratio of the thickness of the thickest part to the thickness of the thinnest part thereof can be easily increased.

The invention claimed is:

1. A tapered multifilament yarn comprising a plurality of ultra-high molecular weight polyethylene filaments and not comprising metal particles or a synthetic resin coating,
   wherein the plurality of ultra-high molecular weight polyethylene filaments are tapered by a process comprising:
   subjecting an ultra-high molecular weight polyethylene filament to a tapering process comprising feeding the filament into a drawing apparatus wherein:
   a first portion of the filament is subjected to taking-over on the drawing apparatus at a take-over speed faster than a feed speed and thereby stretching and thinning the first portion of the filament, and
   a second portion of the filament is subjected to taking-over on the drawing apparatus at a take-over speed slower than a feed speed at a ratio of the take-over speed to the feed speed of not less than 0.5 and less than 1.0 under heating and thereby shrinking and thickening the second portion of the filament to a thickness greater than a thickness of the second portion of the filament prior to the tapering process,
   wherein a ratio of a cross section area of a thickest part to a cross section area of a thinnest part of the tapered multifilament yarn is not less than about 6.0, and
   wherein if the ultra-high molecular weight polyethylene filament is subjected to a drawing process prior to the tapering process, then a value η of the tapered filament equal to (highest take-over speed to the feed speed ratio of the tapering process)/(lowest take-over speed to the feed speed ratio of the tapering process) is not more than 0.8 times a value η of a tapered filament which is not subject to a drawing process prior to the tapering process.

2. The tapered multifilament yarn according to claim 1, wherein a fineness of the second portion of the filament after the tapering process is not more than 2 times a fineness of the second portion of the filament prior to the tapering process.

3. The tapered multifilament yarn according to claim 1, wherein the ratio of the cross section area of the thickest part to the cross section area of the thinnest part of the tapered multifilament yarn is not more than about 10.2.

4. A tapered multifilament yarn comprising a plurality of ultra-high molecular weight polyethylene filaments and not comprising metal particles or a synthetic resin coating,
wherein the plurality of ultra-high molecular weight polyethylene filaments are tapered by a process comprising:
subjecting a ultra-high molecular weight polyethylene filament to a tapering process comprising feeding the filament into a drawing apparatus wherein:
a first portion of the filament is subjected to taking-over on the drawing apparatus at a take-over speed faster than a feed speed and thereby stretching and thinning the first portion of the filament, and
a second portion of the filament is subjected to taking-over on the drawing apparatus at a take-over speed slower than a feed speed at a ratio of the take-over speed to the feed speed of not less than 0.5 and less than 1.0 under heating and thereby shrinking and thickening the second portion of the filament to a thickness greater than a thickness of the second portion of the filament prior to the tapering process,
wherein a ratio of a diameter of a thickest part to a diameter of a thinnest part of the tapered filament yarn is not less than about 2.4,
wherein if the ultra-high molecular weight polyethylene filament is subjected to a drawing process prior to the tapering process, then a value η of the tapered filament equal to (highest take-over speed to the feed speed ratio of the tapering process)/(lowest take-over speed to the feed speed ratio of the tapering process) is not more than 0.8 times a value η of a tapered filament which is not subject to a drawing process prior to the tapering process.

5. The tapered multifilament yarn according to claim 4, wherein the ratio of the diameter of the thickest part to the diameter of the thinnest part of the tapered filament yarn is not more than about 3.2.

* * * * *